Figure 1:
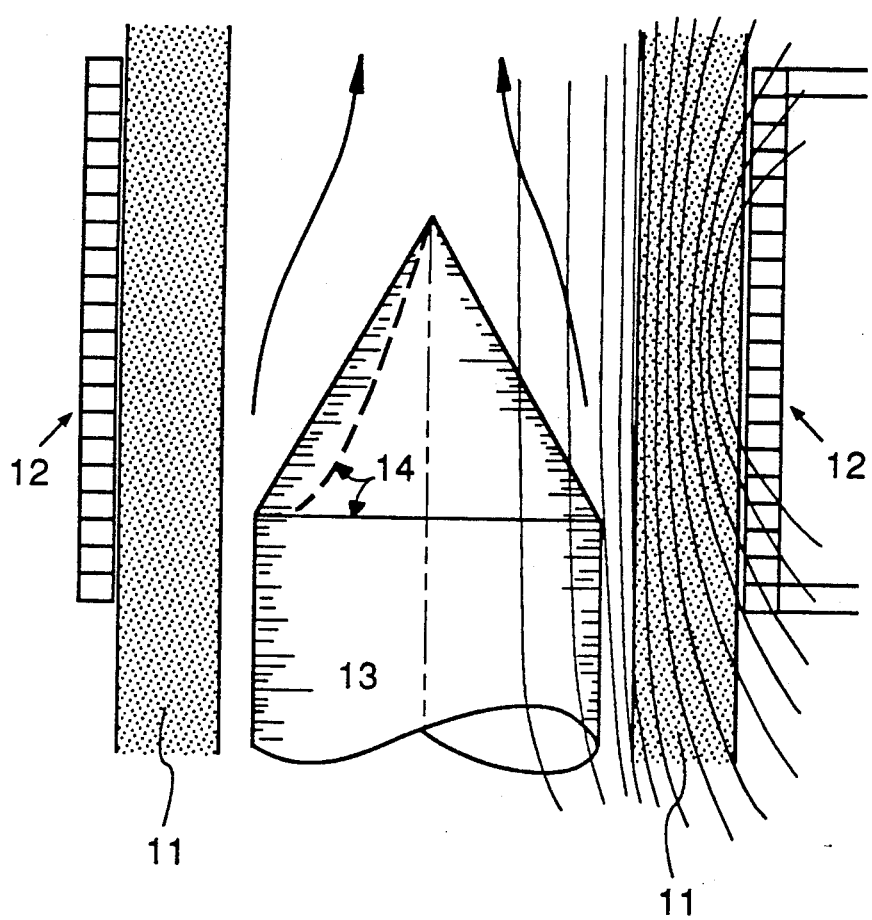

United States Patent [19]
Odd

[11] Patent Number: 5,042,969
[45] Date of Patent: Aug. 27, 1991

[54] PUMP OR A CONTROL VALVE FOR MOLTEN METAL

[76] Inventor: Todnem Odd, Trondheim, Norway

[21] Appl. No.: 297,243

[22] PCT Filed: May 3, 1988

[86] PCT No.: PCT/NO88/00034
§ 371 Date: Feb. 2, 1989
§ 102(e) Date: Feb. 2, 1989

[87] PCT Pub. No.: WO88/09083
PCT Pub. Date: Nov. 17, 1988

[30] Foreign Application Priority Data
May 5, 1987 [NO] Norway ................ 871855

[51] Int. Cl.$^5$ ........................... H02K 44/06
[52] U.S. Cl. ........................ 417/50; 310/11
[58] Field of Search ................ 417/50; 310/11

[56] References Cited
U.S. PATENT DOCUMENTS
2,929,326  3/1960  Ingels ................ 417/50
3,706,399 12/1972  Sundberg ............ 417/50

FOREIGN PATENT DOCUMENTS
59-76166  1/1984  Japan.
0018965  1/1987  Japan ................ 417/50
0178153  8/1987  Japan ................ 417/50

OTHER PUBLICATIONS
R. Panholzer, "Electromagnetic Pumps", Feb. 1963, in Electrical Engineering, pp. 128-135.

Primary Examiner—Leonard E. Smith
Assistant Examiner—David W. Scheuermann
Attorney, Agent, or Firm—Skjerven, Morrill, MacPherson, Franklin & Friel

[57] ABSTRACT

A pump or a control valve for molten metal with a pipe (11) made of refractory or sufficiently resistant materials which are absolutely or almost non-conductive to electricity. An induction coil (12) for alternating current is concentrically-situated in a certain position surrounding the pump pipe. A cylindrical displacement unit (13) which has a smaller diameter than the bore of the pump pipe ends in the area of the pipe where the coil is located. A cylindrical annulus is formed, which in the vicinity of the coil extends to the full cross section of the pipe.

20 Claims, 5 Drawing Sheets

PUMP OR A CONTROL VALVE FOR MOLTEN METAL

The invention refers to a pump or a control valve for molten metal.

The transport of molten metal from one location to another for various purposes, particularly for casting purposes, has always been a dangerous operation which has been difficult to control.

PRINCIPLES OF KNOWN PUMPS

There are a number of different types of pumps apart from the purely mechanical devices to obtain sufficient pressure to produce movement in molten metal. The straightforward mechanical pumps such as centrifugal pumps have certain limitations due to temperature problems, the durability of the materials in the pump, blockages etc. Using compressed air, pressurized gas or vacuum all require special designs with obvious drawbacks.

Some metal pumps on the market utilize electrical phenomena. These are based on the known phenomenon that when a current carrying conductor crosses a magnetic flux the conductor is subjected to a mechanical force. This principle is used for pumps where a direct current is led through the metal by means of conducting electrodes, which are in contact with the metal. The magnetic flux which crosses the field of current through the metal is created by either a permanent or a DC magnet. The problem with this type of pump is the restricted lifetime of the electrodes and the insulation surrounding them. Another problem is the corrosion of the electrodes which causes impurities in the metal.

The same basic principle could be applied from an asynchronous motor to molten metal pumps. Here, the molten matter is subjected to a travelling magnetic field from a linear wound motor in a duct of refractory material. This is a relatively complex electrical design and great care has to be taken with the refractory material so as to reduce the air space as much as possible.

PURPOSE OF THE INVENTION

The overall objective of the invention is to design a pump or control valve which is simpler and cheaper to produce and operate than known pumps. A more specific aim is to design a pump which satisfies the following conditions:

the magnetic flux and an induced current, which in combination result in a rise in pressure, must be produced by means of a straightforward static coil carrying alternating current (usually at mains frequency)

no electrical components are to come into contact with the molten metal there must be no critical wall thickness for the pipe or duct which carries the molten metal.

PRINCIPLE OF THE INVENTION

Based on the above, a pump/control valve could be designed in accordance with the characterizing part of claim of patent 1. Other advantageous features are indicated in the subsidiary claims.

For the sake of simplicity, the principle of the invention will be explained with reference to the pump function. The control valve function is achieved by mounting the pump against the direction of flow.

Another simplification in explaining the means of operation is that reference is made to a cylindrical design of the pump. This is not an absolute necessity should a square or polygonal cross section be preferable for any reason.

A device in accordance with the invention will solve many problems encountered whilst handling molten metal.

As this pump can be fully-regulated from zero to the maximum lifting height it is designed for, it can be advantageously used for:

the accurate control of the quantity of molten metal during continuous casting for example quick casting of small runs for a production series (low pressure and die casting)

casting individual lumps of alloy, ferro-alloys for example emergency pumping of molten metal emptying accessories for casting equipment such as filtration units.

The pump can be used to replace the lifting or tipping units which are widely used to obtain adequate head and flow control.

A pump designed for a small pressure rise, but large flow volumes could be used for:

the transport of molten metals in dedicated channels or pipes stirring in furnaces or mixing containers for refining, for the correction of alloy or for the addition of fibres etc.

When used as a control valve for molten metal the pump in the present invention could be located so that a counterpressure to gravitational forces is formed during tapping. As a control valve, this design will allow most of the functions mentioned for the pump to be carried out, however the dimensions could be somewhat less exacting.

EXAMPLE

Figure 2A:
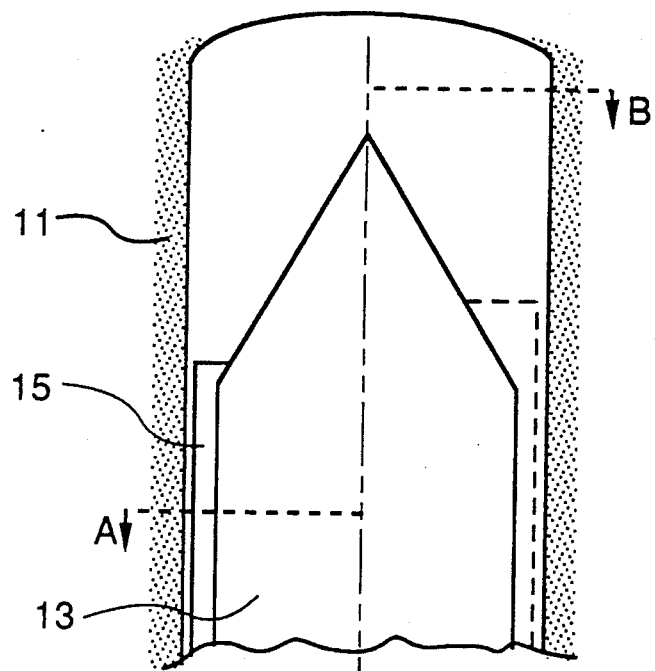
Figure 2B:
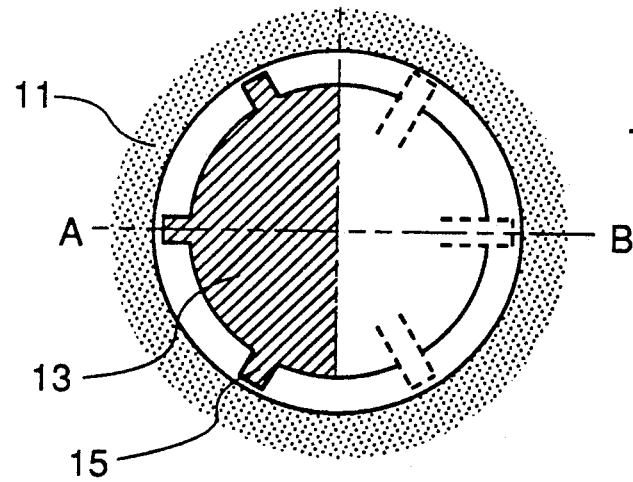

The illustrations show in FIG. 1 a longitudinal axial section through the central part of a pump designed in accordance with the invention, FIG. 2A an equivalent longitudinal axial section through an alternative design of the pump in FIG. 1, whilst FIG. 2B shows a cross section along line A-B in FIG. 2A.

Figure 3:
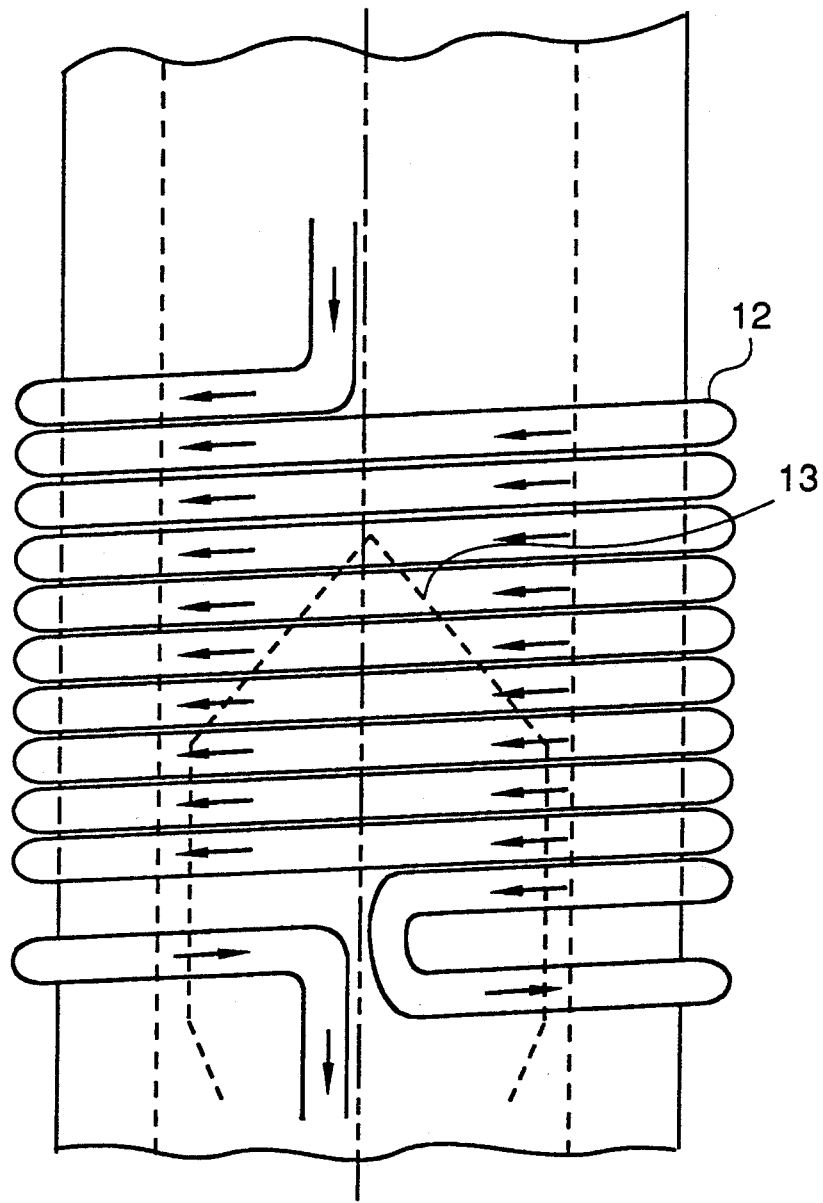
Figure 4:
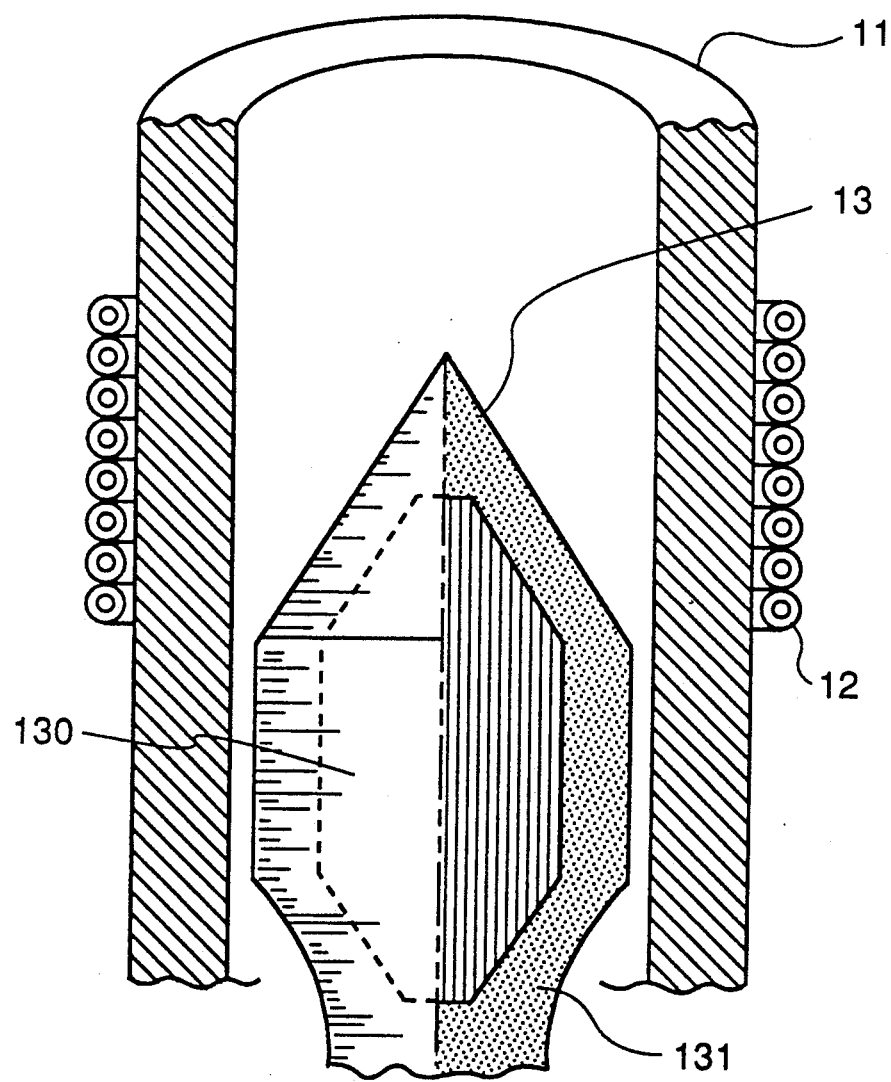
Figure 5:
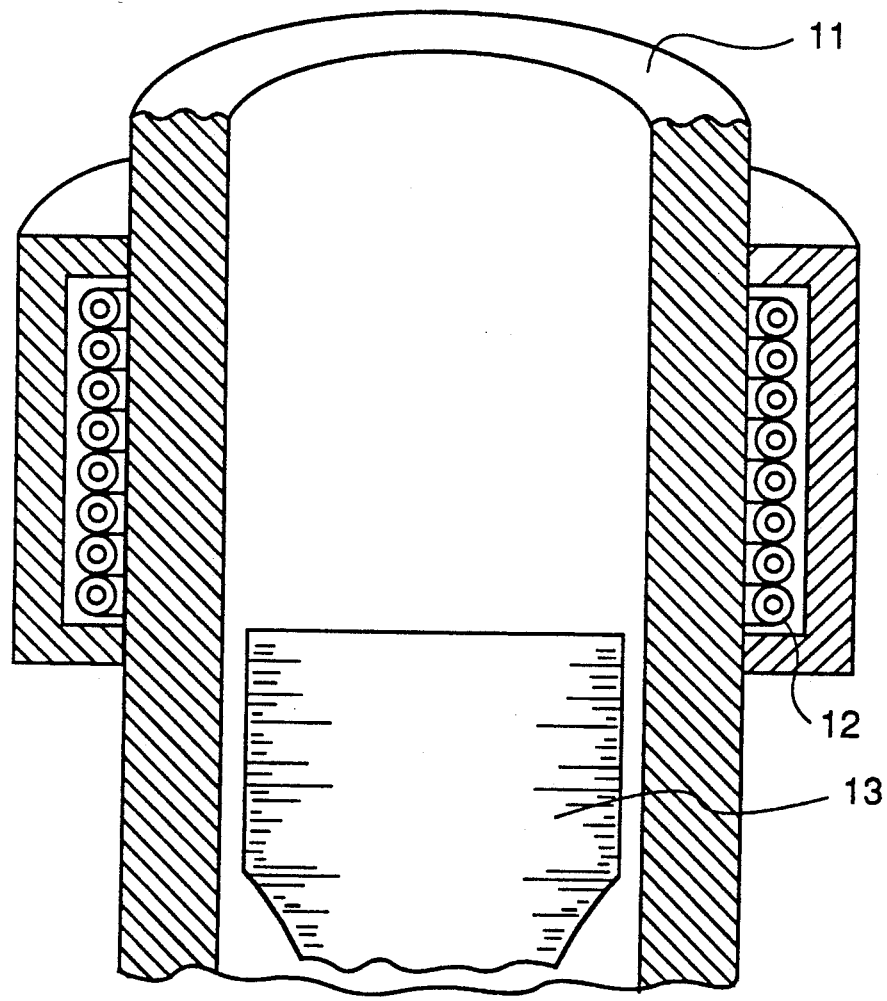

FIG. 3 shows counterwindings in accordance with this invention,

FIG. 4 shows the displacement unit 13 with a magnetic core 130 encased in refractory material 131, and FIG. 5 shows magnetic material 120 placed around the coil 12.

The basic element for the metal pump is schematically presented in FIG. 1. The cylindrical pump pipe 11 is surrounded by a concentrically-located induction coil 12. There is a displacement unit 13 situated in the vicinity of the lower end of the coil. This can be conical at one end as shown in FIG. 1, or finished in another means, as for instance indicated by the broken curves 14 in the figure. When the coil is carrying an alternating current, a magnetic flux will be created as indicated by the field lines which enter the pump pipe which is full of metal, this will induce current in concentric paths in the metal. Wherever the current and magnetic field cross in the molten metal, pressure will be created towards the centre. This will add up to a maximum in the middle of the pump shaft. Even though the pressure which is created is highest just inside the pump wall, where the flux and the induced current density are greatest, the resultant pressure is largest in the middle of the pump barrel where there is an integration of the pressure formed throughout the volume of the pump. If there had been nothing else than molten metal in the pipe, the metal could have flowed in both directions from the coil. The most important feature of the invention is the location of a torpedo-shaped displacement unit concentrically in the pipe. This forms an annulus for the molten metal around the displacement unit. The smaller the distance between the displacement unit and the pump pipe—in FIG. 1 this distance is indicated by $t_r$—the greater the pressure rise ahead of the leading edge of the displacement unit. Since the displacement unit is permanently fixed in relation to the pump pipe and the coil, the pressure in the molten metal which is formed at the front of the displacement unit will only be able to move the metal in one direction. This is indicated by the arrows in FIG. 1.

Before the pump is able to obtain enough pressure to drive the molten material in one direction, it is necessary that part of the pressure rise occurs at the leading edge inside the cross section of the displacement unit in the pump barrel. As shown in FIG. 1 there will also be pressure upon the metal in the annular space around the displacement unit. This will work in the opposite direction to the pump and will limit its pressure head. The counter pressure can be reduced by making the previously mentioned distance as small as possible. Here there are technical flow problems and other practical limitations.

One means of solving this problem—which is another important point of this invention—is adding a series of fins 15 to the ceramic exterior of the displacement unit, as indicated in FIG. 2. These fins can either tail off abruptly or terminate further forward on the front of the displacement unit. The fins divide the annulus into sectors and thereby hinder, or at least severely restrict, induced current entering this area. The result is that the pressure formation is reduced in an area where it is exclusively negative. In an alternative design the fins could be integrated with the pipe 11, so that they protrude radially inwards from the wall of the pipe.

As it has been assumed that the displacement unit is not made of an electrically conducting material, there is also the possibility of increasing the pressure head of the pump by constructing a displacement unit, with a core of magnetic material. FIG. 4 shows the displacement unit 13 with a magnetic core 130 encased in refractory material 131. The purpose of this is to influence the field from the coil so that even more field lines will create a pressure contribution in a positive direction. This can be further amplified by placing magnetic material 120 on the outside of the coil 12, as shown in FIG. 5.

In FIG. 5 the displacement unit 13 is shown with a flat end. It should be understood, of course, that displacement unit 13 can also have a different shape such that the end of displacement unit 13 adjacent to coil 12 is non-flat. In one embodiment this end comes to a point as shown in FIG. 1, for example.

Another means of influencing the field from an induction coil, as in this example, is locating counter windings at the end of the coil, or a short-circuit winding.

FIG. 3 illustrates one implementation of counter-windings at the end of the coil 12.

If there is an operational halt, or possibly even under normal conditions, the pump and the pipe linings to and from the pump must be heated to prevent the molten metal from solidifying. This can be achieved by inductive heating using windings around the pipes. For the pump itself it is important to ensure that there is a certain amount of clearing between the fins and the pump pipe. If fins are required for fitting the displacement unit inside the pump pipe, this can be done by making a notch in the back of the fins. The description which has been given in this section should be considered as an illustration of a pump design where many details must be adjusted to obtain an optimal configuration.

I claim:

1. A pump or a control valve for molten metal comprising
   a pipe (11) of a material, which is at least substantially non-conductive to electricity,
   a concentric induction coil (12) for carrying alternating current around said pipe, and
   a displacement unit (13) located in the pipe, said displacement unit having a first end which is laterally overlapped by said coil and having a smaller diameter than the bore of the pump pipe so that an annular space is formed between the displacement unit and the inner surface of said pipe, said first end of said displacement unit tapering to a point such that, in the proximity of and before the end of the coil this annular space extends to the full cross section of the pipe.

2. A pump or a control valve in accordance with claim 1 wherein the displacement unit's end (14) in the pressure direction tails off abruptly in the proximity of the coil.

3. A pump or control valve for molten metal comprising:
   a pipe of a material which is substantially non-conductive to electricity, said pipe having an inside diameter;
   a generally cylindrical shaped displacement unit disposed in said pipe, said unit having an outside diameter smaller than said inside diameter of said pipe thereby forming a cylindrical annular space between said unit and said pipe, said unit having a pressure end; and
   a concentric induction coil around a portion of said pipe;
   wherein said portion of said pipe overlaps said pressure end of said unit.

4. A pump or control valve in accordance with claim 3 wherein said displacement unit includes a number of longitudinal radial fins which divide said cylindrical annular space into arc sections.

5. A pump or control valve in accordance with claim 3 wherein the portion of the induction coil which laterally overlaps a portion of said displacement unit adjacent said first end of said displacement unit is completed by windings which carry current in a direction counter to the direction of the current in the remainder of the coil.

6. A pump or control valve in accordance with claim 3 wherein said cylindrical displacement unit has a surface which is lined with refractory materials.

7. A pump or control valve in accordance with claims 3 or 6 further comprising a magnetic material which is disposed around the outside of said coil.

8. A pump or control valve in accordance with claim 3 wherein an end of said induction coil which is adjacent to and laterally overlaps said displacement unit is completed by a short-circuit winding at said end of said coil.

9. A pump or control valve according to claim 3 wherein said pipe is lined with electrically insulating refractory material.

10. A pump or control valve for molten metal comprising:
- a pipe including heat resistant materials, which are substantially non-conductive to electricity;
- a concentric induction coil surrounding said pipe; and
- a displacement unit fixed within said pipe which has a smaller diameter than a bore of said pipe, so that an annular space is formed between an outside of said unit and said pipe, at least a portion of said annular space being cylindrical, wherein any cross sectional area of a portion of said displacement unit adjacent a first end of said displacement unit is laterally bounded by said annular space and said cross sectional area of said portion of said displacement unit diminishes as said annular space expands to fill a full cross section of said pipe at a location adjacent to said first end of the displacement unit,
- wherein said coil is located with a first end and a first portion of said coil disposed beyond said first end of the displacment unit, and
- wherein a second portion of said coil adjacent a second end of said coil overlaps said portion of said displacement unit adjacent said first end of the displacement unit.

11. A pump or control valve according to claim 10 wherein said first end of said displacement unit terminates in a point on the axis of said pipe, wherein a transition surface of said displacement unit from said cylindrical annular space to said point comprises a general conical shape with the point of the cone corresponding to said first end of said displacement unit.

12. A pump or control valve according to claim 11 wherein said transition surface of said displacement unit forms a cone.

13. A pump or control valve according to any one of claims 10, 11 or 12, wherein the displacement unit includes a number of longitudinal radial fins which terminate in close proximity to the first end of the displacement unit.

14. A pump or control valve according to any one of claims 10, 11 or 12, wherein a bore of said pipe has a number of longitudinal radial fins which divide said annular space into arc sections and said fins terminate in close proximity to the first end of the displacement unit.

15. A pump or control valve according to either one of claims 11 or 12 wherein said displacement unit includes a magnetic material.

16. A pump or control valve according to either one of claims 11 or 12 wherein the displacement unit includes a magnetic core surrounded by refractory materials.

17. A pump or control valve in accordance with claim 11 wherein a magnetic material is placed around the outside of the coil.

18. A pump or control valve according to claim 11 wherein said general conical shape is concave outward.

19. A pump or control valve for molten metal comprising:
- a pipe having a bore lined with refractory material which is substantially an electrical insulator;
- a concentric induction coil for carrying alternating current surrounding a section of said pipe; and
- a displacement unit disposed inside of said pipe having a diameter smaller than the bore of the pipe, thereby forming an annular space therebetween, at least a portion of said annular space having both inner and outer cylindrical surfaces, said displacement unit being disposed such that said displacement unit contracts to a point to terminate at a location within the pipe laterally adjacent to the coil and said annular space expands to a full cross section of the pipe.

20. A pump or control valve in accordance with claim 19 wherein said coil has a first end and a second end, wherein said displacement unit is disposed inside of and adjacent said first end of said coil but not adjacent said second end of said coil.

* * * * *